United States Patent [19]

Steenton et al.

[11] Patent Number: 5,483,573
[45] Date of Patent: Jan. 9, 1996

[54] ELECTRIC CIRCUIT CONNECTOR WITH AUTO-TERMINATION

[75] Inventors: George R. Steenton, Howell, N.J.; Michael T. Calderwood, Chantilly, Va.

[73] Assignees: Keptel, Inc., Tinton Falls, N.J.; Bell Atlantic Network Services, Inc., Arlington, Va.

[21] Appl. No.: 85,581

[22] Filed: Jun. 30, 1993

[51] Int. Cl.$^6$ ............................ H04M 1/24; H04M 3/22; H04M 1/00; H04M 3/00

[52] U.S. Cl. ........................ 379/2; 379/8; 379/21; 379/22; 379/24; 379/27; 379/29; 379/30; 379/161; 379/184; 379/194; 379/195

[58] Field of Search .................. 379/2, 8, 21, 22, 379/24, 27, 29, 30, 161, 184, 194, 195

[56] References Cited

U.S. PATENT DOCUMENTS

| | | | |
|---|---|---|---|
| 4,369,341 | 1/1983 | Ahuja | 379/27 |
| 4,782,507 | 11/1988 | Siligoni | 379/27 |
| 4,805,210 | 2/1989 | Griffith, Jr. | 379/195 |
| 4,853,949 | 8/1989 | Schorr | 379/2 |
| 4,969,179 | 11/1990 | Kanare | 379/27 |
| 4,991,196 | 2/1991 | Krebs | 379/30 |
| 5,030,123 | 7/1991 | Silver | 439/188 |
| 5,056,131 | 10/1991 | Kanare et al. | 379/27 |
| 5,063,585 | 11/1991 | Shapiro | 379/27 |
| 5,265,154 | 11/1993 | Schotz | 379/184 |

*Primary Examiner*—Stephen Chin
*Assistant Examiner*—Vijay Shankar
*Attorney, Agent, or Firm*—Peter L. Michaelson

[57] ABSTRACT

A connector unit (21) for automatically terminating a digital data services (DDS) line whenever a mating modular plug (30) is not inserted into the connector. The connector utilizes a switchable DDS jack (25) that mates with the modular plug (30) for connecting a data-transmit line and a data-receive line of a DDS network (41) to a customer's equipment (45). The connector unit has a maintenance termination circuit (40) with terminating impedances (r, r1, C and C1) and diodes (D and D1). When the plug and jack are not engaged, the maintenance termination circuit is connected to the data-transmit and data-receive lines via the normally closed jack contacts (33 and 34). As the plug and jack are engaged, the plug abuts against and, as movement continues, increasingly opens the jack contacts, causing the maintenance termination circuit to be disconnected from the customer's equipment and to be connected to the DDS network. The diodes are oppositely polarized to provide a signature for testing proper installation of the connector unit. When connected to the DDS network, the terminating impedances provide electrical terminating loads which reduce network noise.

19 Claims, 4 Drawing Sheets

ELECTRIC CIRCUIT CONNECTOR WITH AUTO-TERMINATION

BACKGROUND OF THE INVENTION

1. Field of the Invention

The invention relates to electric circuit connectors. More particularly, the invention relates to connectors having an auto-termination circuit.

2. Description of the Prior Art

The use of special impedance matching circuits for terminating unused output terminals of electric circuits is well known in the art. In high-speed communication networks, for example, it is usually desirable and, in some cases even required by regulating authorities, to have those output terminals that are not connected to other equipment electrically terminated. Terminating devices are generally necessary because networks having non-terminated conductors can be subject to noise. For instance, emissions from various sources of radiation can induce network noise on a pair of non-terminated conductors. Also, a transmission line having non-terminated terminals is subject to noise from signal reflections at these terminals. Further, excessive signal levels on a pair of non-terminated conductors can cause crosstalk to other channels residing in common cabling. As such, it is generally known that a communications network containing non-terminated circuitry can be subject to substantial noise.

A specific example of a circuit within a communication network in which terminating devices are virtually essential is a telephone digital data services (DDS) circuit. Conventional DDS circuits are high-speed private data transmission links that typically propagate signals at digital data rates of 2.4, 4.8, 9.6, 19.2, 38.4, 56.0, or 64.0 kilobits per second. These circuits are most often used by those telephone company customers that require high-speed data links between two or more locations, such as between state lottery machines and a lottery control center, or automatic teller machines (ATM) and an ATM transaction processing center. In the past, telephone companies terminated DDS circuits at a customer's premises with a terminating device called a channel service unit (CSU). A CSU is primarily designed to provide well known digital data interfacing functions such as signal sampling, filtering, regeneration, discrimination and the like. However, besides these digital interfacing functions, such CSU devices are also capable of providing proper electric termination of the DDS circuit at the customer's premises. Additionally, CSU devices provide maintenance loopback functions for use by the telephone company to locate problems and verify proper installation of the end-link facilities.

More recently and primarily motivated by a recent Federal Communications Commission Ruling, CSU devices are no longer installed as telephone equipment but are installed as customer-provided equipment. As such, at initial installation, telephone companies have been using, when deemed necessary, other devices to provide maintenance and termination capabilities. One type of termination device which is currently being installed by telephone companies is called a DDS "smart jack." These devices are capable of providing proper electrical termination of a DDS circuit at the customer's premises as well as maintenance loopback functions. Maintenance loopback functions enable a telephone company to remotely disconnect the customer's equipment and loopback any transmitted signal to the central office. In this manner, the telephone company can test the transmission circuit to/from the DDS "smart jack". In addition, most DDS "smart jacks" provide a repeater function which permits extended-range operation. In other words, the DDS "smart jack" permits the telephone company to provide DDS over longer loops than could have been possible without the DDS "smart jack". A repeater is usually required when a DDS loop is of a length that attenuates a signal propagating thereupon by between 34 dB and 45 dB.

Though the "smart jack" and similar terminating devices have been successfully used, they have not been widely accepted in all situations for a number of reasons. For one, "smart jacks" are relatively expensive. Also, most "smart jacks" are active devices which must be connected to the customer's power. This power requirement can present several problems. First, a customer may not wish to have an additional equipment (a "smart jack") connected to the customer's power supply, especially if those functions that require power, e.g., the repeater functions, are not needed by the customer. Also, at the time that many DDS installations are provided, i.e., during building construction, the customer is typically not ready to connect its equipment to a power supply and/or the customer's power is not yet turned on. As such, in many DDS installations, use of the "smart jack" or other active electric termination is not possible, leaving the telephone company with the problem of not being able to verify proper installation. Also, as mentioned above, a non-terminated DDS installation produces an open loop within the communications network which can be a source of substantial network noise. It is noted, of course, that the foregoing problems are not limited to communication networks, but can also occur in other high-speed electronic systems.

Consequently, those concerned with the development of connectors for DDS circuits and other systems requiring electrical termination have long recognized the need for improved circuits that can provide auto-termination and maintenance functions in a simple, reliable and inexpensive device.

SUMMARY OF THE INVENTION

Accordingly, an object of the present invention to provide an electric circuit connector with an auto-termination circuit.

Another object of the invention is to provide a circuit terminating connector having a maintenance termination function for testing the circuit for proper installation.

A further object is to provide a circuit connector containing a passive maintenance terminating unit that terminates a circuit loop, provides a predetermined test "signature" for the terminating unit and requires no external AC or DC power to operate.

Still another object of the invention is to provide a circuit connector with auto-termination that is engaged, i.e., terminates the circuit, only when customer equipment is disconnected therefrom.

These and other objects are achieved in accordance with our invention by providing an electric circuit connector that provides reliable auto-termination and maintenance functions in an economical manner. Our present invention is a unique circuit connector having a maintenance terminating unit that is engaged only when end-user equipment is disengaged from the connector.

In a broad aspect of the invention, a circuit connector, capable of engagement with a mate connector, has at least one pair of connector terminals and at least one pair of auto-termination terminals. A maintenance termination circuit, connected across the auto-termination terminals, has a terminating impedance and a signature device. The signature device is responsive to a predetermined voltage across the auto-termination terminals. The circuit (network) applies the predetermined voltage to the auto-termination terminals. A switch is connected between the connector terminals and the auto-termination terminals. The switch connects the connector terminals to the auto-termination terminals only when the connector and its mate are not engaged, and disconnects the connector terminals from the auto-termination terminals when the connector and its mate are engaged.

More specifically, the switch is a normally closed switchable jack having a plurality of moveable contacts and corresponding fixed contacts. The auto-termination terminals are connected to the fixed contacts and the connector terminals are connected to the moveable jack contacts. The moveable contacts are positioned in the jack for moveable engagement with corresponding contacts on the mate connector, which may be a conventional plug. As such, the maintenance termination circuit connects to the connector terminals via the jack contacts when the mate or plug is not engaged with the jack. When the mate or plug engages with the jack, the mate contacts connect to the connector terminals via the moveable contacts. Also, at this time, the moveable jack contacts disengage from the fixed contacts, thereby disconnecting the maintenance termination circuit from the connector terminals.

A more specific aspect of the invention is directed to a DDS connector unit having a switchable jack that is designed to engage a conventional plug. The DDS connector unit has two pairs of connector terminals and two pairs of auto-termination terminals. Each pair of connector terminals is connected to tip and ring signal paths of data-transmit and data-receive conductor pairs of a DDS network. The unit has a maintenance termination circuit, with terminating impedances and diodes, which is connected across each pair of the auto-termination terminals. The switchable jack includes a plurality of moveable and fixed contacts which are connected between the connector terminals and the auto-termination terminals. When the plug and jack are not engaged, the maintenance termination circuit connects to the connector terminals via the jack contacts. When the plug and jack are engaged, the plug contacts engage and move the moveable jack contacts. Consequently, such engagement disconnects the maintenance termination circuit from the connector terminals and connects the plug contacts to the tip and ring conductor pairs via the connector terminals. The diodes in the maintenance termination circuit are oppositely polarized to provide a maintenance circuit for testing proper installation of the connector unit when the jack and plug are disengaged. Also when the jack and plug are disengaged, the terminating impedances provide electrical terminating loads which prevent noise in the DDS network.

BRIEF DESCRIPTION OF THE DRAWINGS

Other objects and the teachings of the present invention can be readily understood by considering the following detailed description in conjunction with the accompanying drawings, in which.

DETAILED DESCRIPTION OF THE PREFERRED EMBODIMENT

Figure 1:
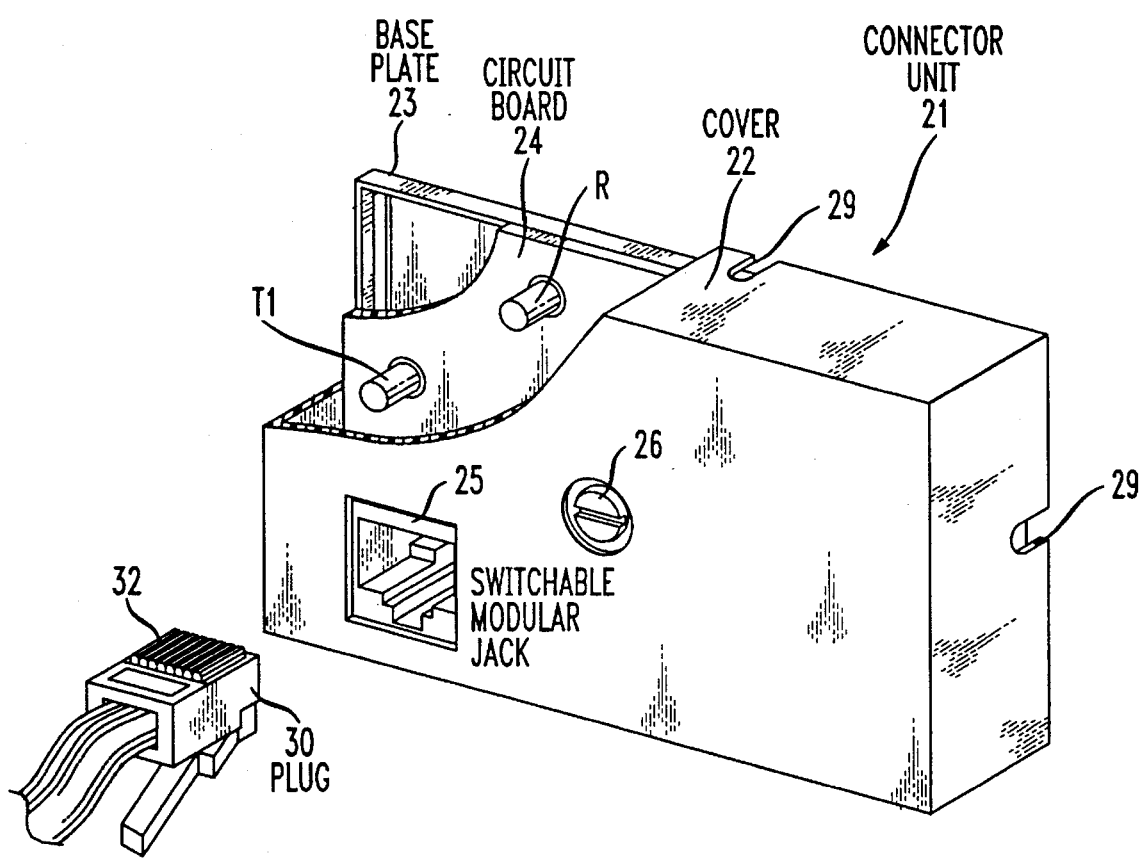
FIG. 1 is a pictorial view with parts broken away of a preferred embodiment of the invention.
Figure 2:
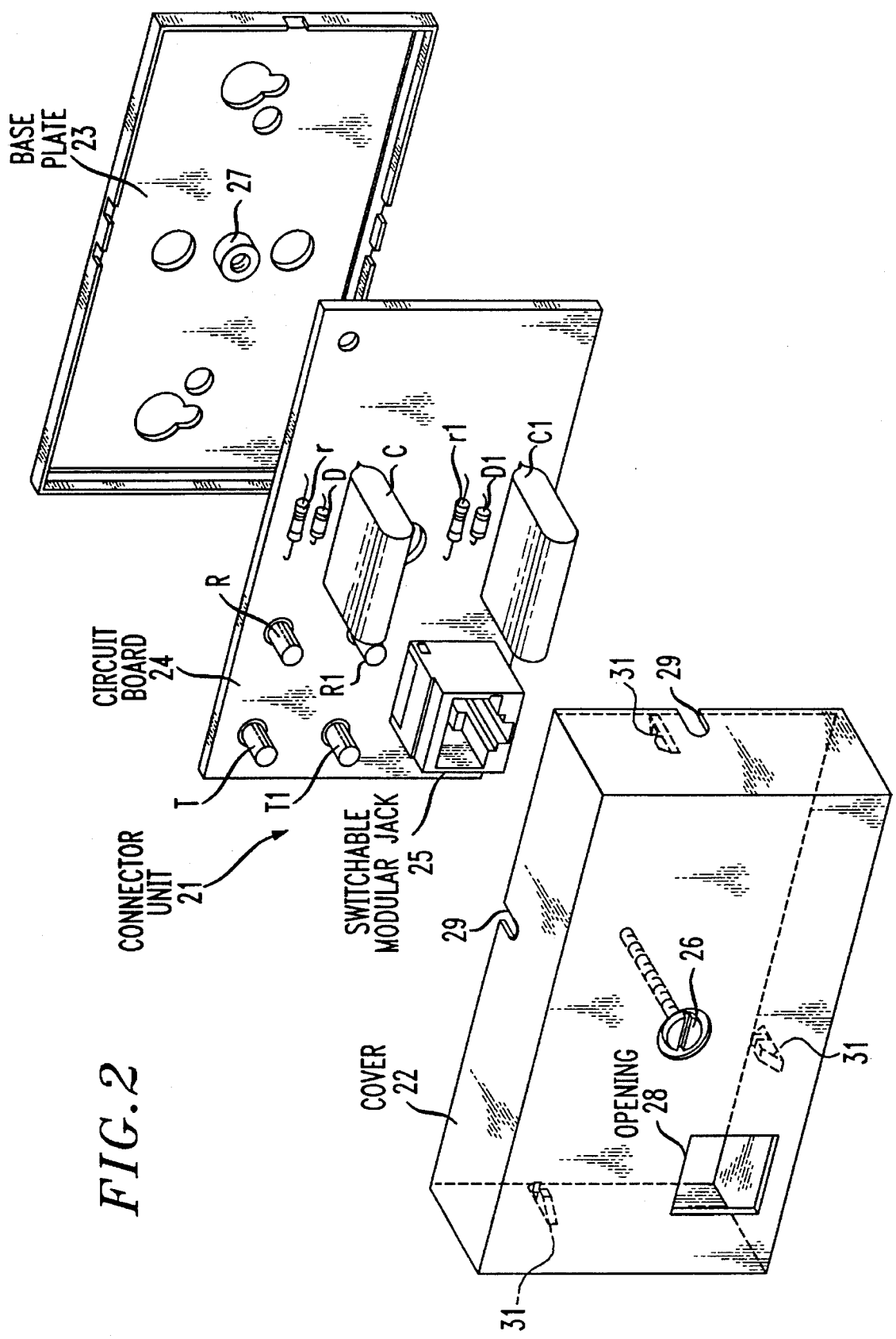
FIG. 2 is an exploded pictorial view of the device shown in FIG. 1.

Referring now to the drawings, there is shown in FIGS. 1 and 2 connector unit 21 having cover 22, base plate 23 with mounting holes, circuit board 24, and switchable modular jack 25 which is fixed to the front, component surface of circuit board 24. Connector unit 21 is held in the assembled position (see FIG. 1) by a screw 26 which passes through center openings in cover 22 and circuit board 24, and is threaded into threaded hole 27 (see FIG. 2) in base plate 23. Circuit board 24 is secured in slotted lugs 31 on the inside surface of cover 22 such that jack 25 mates with an opening 28 in cover 22. The sides of cover 22 are shown with conventional cable cutouts 29.

The general configuration of connector unit 21 and jack 25 illustratively portrays a conventional wall-mountable modular jack assembly commonly used in commercial telephone installations. Jack 25 is designed to receive a conventional modular plug 30. Connector unit 21 is generally similar to the commercially designated RJ-48S keyed telephone jack while plug 30 represents a conventional modular plug of a type that is compatible with the RJ-48S keyed telephone jack.

Connector unit 21 differs, however, from a conventional RJ-48S jack in the construction details of jack 25 (see FIGS. 3–5) and the circuit details of a maintenance termination circuit which is mounted on circuit board 24. These structural and circuit differences are discussed below in detail. It is noted, however, that while the preferred embodiment is disclosed in the context of the RJ-48S-type jack, it will be evident to those skilled in these arts that our invention has general application with other types of circuit connectors.

Figure 3:
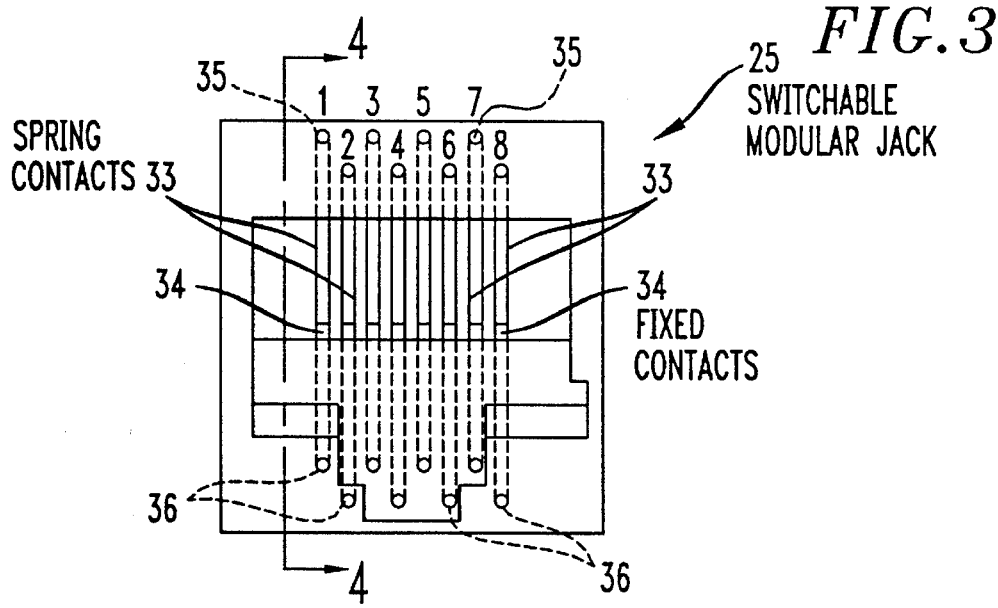
FIG. 3 is a front elevation of jack 25 which forms a portion of the device shown in FIG. 1.
Figure 4:
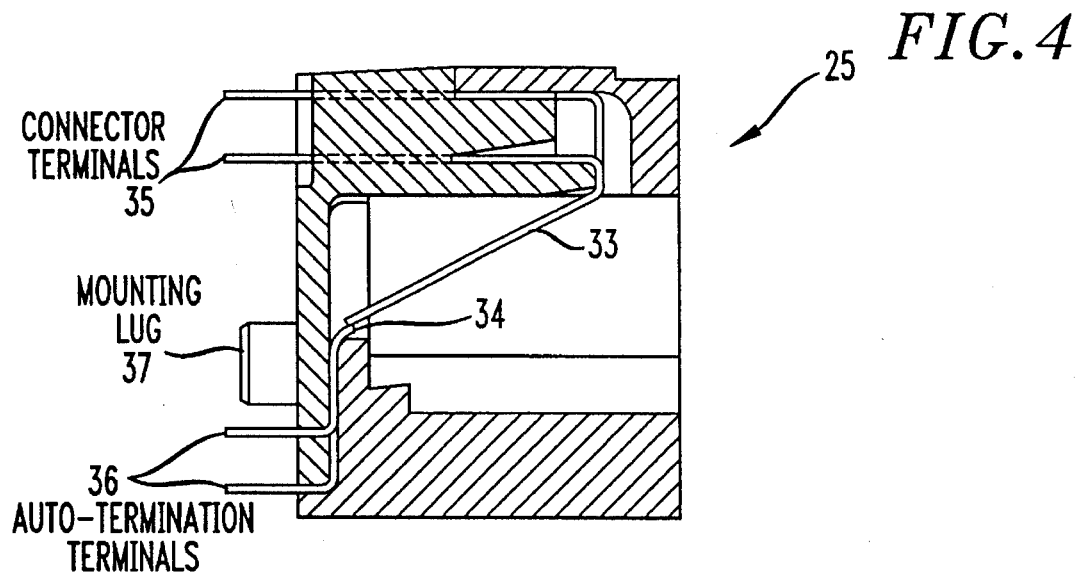
FIG. 4 is a sectional view taken along line 4—4 of FIG. 3 and looking in the direction of the arrows on this line.
Figure 5:
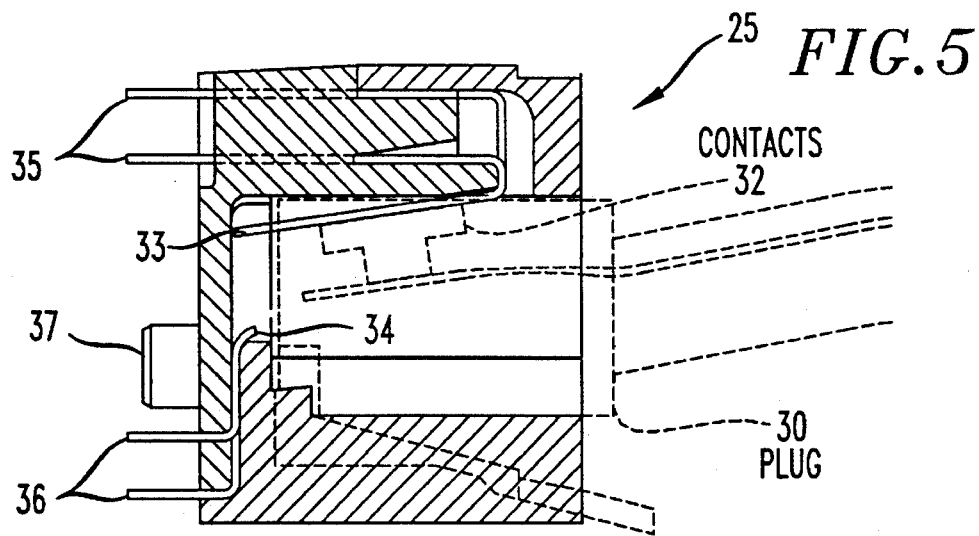
FIG. 5 is a sectional view, similar to the view of FIG. 4, which illustrates jack 25 engaged with mating plug 30 which is shown in phantom.

As shown in FIGS. 3–5, jack 25 is an eight-contact, switchable jack having eight leaf-spring contacts 33 and eight corresponding fixed contacts 34. The free ends of leaf-spring contacts 33 are normally in contact with fixed contacts 34. Jack 25 is switched in response to engagement or disengagement of plug 30 therewith. Specifically, when plug 30 is inserted into jack 25, eight plug contacts 32 engage corresponding leaf-spring contacts 33 and deflect them away from fixed contacts 34. FIG. 5 illustrates the deflected position of contacts 33 when contacts 32 of plug 30, which is shown in phantom, engage contacts 33. When plug 30 is removed from jack 25, contacts 33 return to their normal position which is illustrated in FIG. 4. In FIG. 3, the eight jack contacts 33 are identified by their Universal Service Order Code (USOC) pin numbers 1–8.

Contacts 33 extend to the rear of jack 25 to form two rows of protruding connector terminals 35. Likewise, contacts 34 extend to the rear of jack 25 to form two rows of protruding auto-termination terminals 36. Jack 25 acts as a normally closed, eight-pole switch which connects connector terminals 35 to auto-termination terminals 36 when closed, i.e., when plug 30 is disengaged, and disconnects connector terminals 35 from auto-termination terminals 36 when open, i.e., when plug 30 and jack 25 are engaged. Mounting lugs 37 mount jack 25 on the front, component surface of circuit board 24 (shown in FIG. 2) such that terminals 35, 36 are exposed to the rear, conductor surface of board 24.

Figure 6:
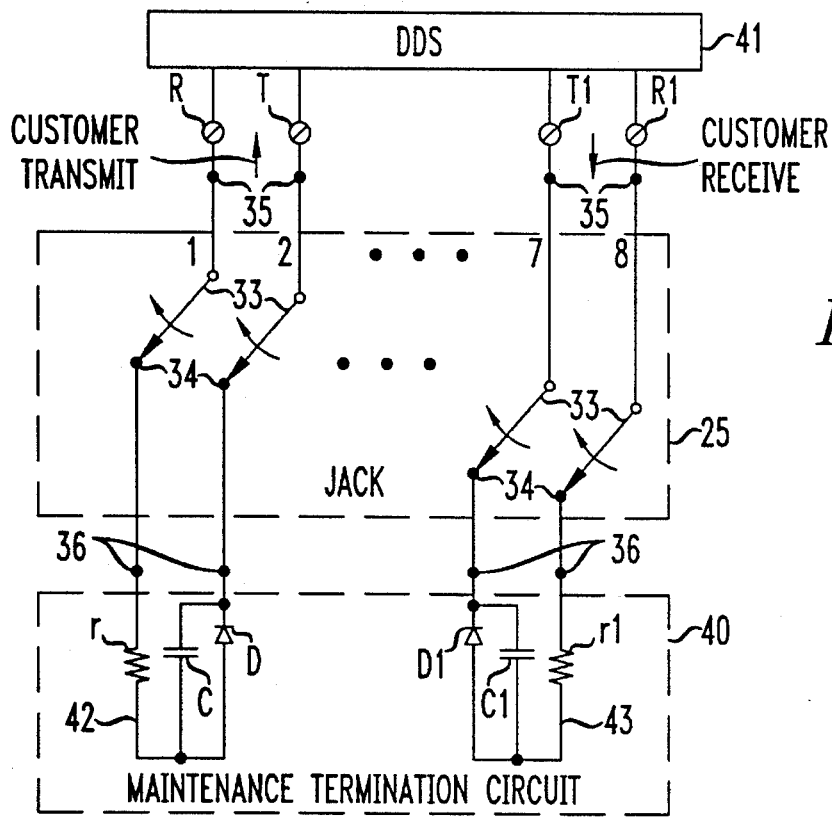
FIG. 6 is a circuit diagram of a DDS circuit before a customer's equipment is connected thereto.
Figure 7:
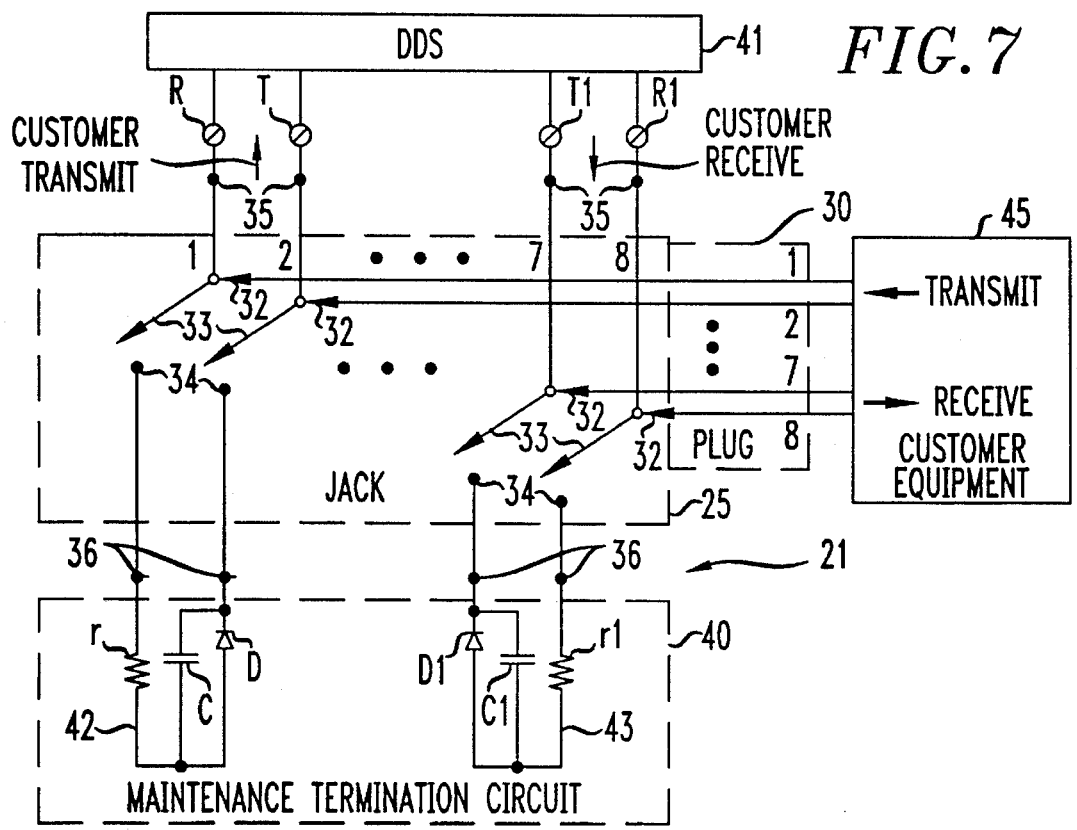
FIG. 7 is a circuit diagram showing the DDS circuit of FIG. 6 after a customer's equipment is connected thereto.

The electrical configuration of connector unit 21 is diagrammatically illustrated in FIGS. 6 and 7 where it is shown in combination with a digital data services (DDS) network 41 having two pairs of conductors, i.e., a customer-transmit conductor pair and a customer-receive conductor pair. As such, only four of the eight connector terminals 35 and auto-termination terminals 36 are used. The pair of terminals 35 that correspond to USOC pins 1 and 2 are used to transmit data from the customer to DDS network 41 via tip and ring terminals T and R, respectively. The other pair of terminals 35, which correspond to USOC pins 7 and 8, are used by the customer to receive data from DDS network 41 via tip and ring terminals T1 and R1, respectively. Terminals T, R, T1 and R1 are depicted in FIG. 2 as terminal screws on circuit board 24.

Maintenance termination circuit 40, depicted in FIGS. 6 and 7, consists of a transmit termination 42 and a receive termination 43. As specifically shown in FIG. 6, transmit termination 42 contains a parallel-connected capacitor C and diode D which are connected on one side to tip terminal T via terminals 35 and 36 and contacts 33 and 34. A second lead of capacitor C and diode D are connected to one lead of a resistor r. A second lead of resistor r is connected to ring terminal R via terminals 35 and 36 and contacts 33 and 34.

Receive termination 43 has a parallel-connected capacitor C1 and diode D1, one lead of each is connected to tip terminal T1 via terminals 35 and 36 and contacts 33 and 34. The other leads of capacitor C1 and diode D1 are connected to one lead of resistor r1. A second lead of resistor r1 is connected to ring terminal R1 via terminals 35 and 36 and contacts 33 and 34.

When connected to network 41 via jack 25, resistors r and r1 and capacitors C and C1 act as passive loads, or terminations, which prevent induced noise, signal reflections, excessive signal levels and other noise signals from being produced on the transmit and receive pairs. Diodes D and D1 are oppositely polarized in their respective circuits such that, when contacts 33 and 34 are closed, direct current can flow from DDS network 41 through the transmit and receive pairs in only predetermined directions, i.e. from tip terminal T to ring terminal R for the transmit pair, and from ring terminal R1 to tip terminal T1 for the receive pair. As such, the nonlinear response of diodes D and D1 passively provide distinctive test "signatures" which may be used for maintenance by the DDS network providers to verify proper installation of their equipment, e.g., connector unit 21.

FIG. 7 shows the condition of connector unit 21 when customer equipment 45 is connected. Customer equipment 45 is connected to DDS network 41 by plug 30, diagrammatically illustrated in FIG. 7 with dashed lines. Contacts 32 are shown connected to contacts 33 but deflected away from fixed contacts 34. The corresponding USOC pin numbers 1, 2, 7, 8 for plug 30 are shown in FIG. 7. Maintenance termination circuit 40 is, therefore, automatically disconnected from DDS network 41 when plug 30 is engaged in jack 25. Removal of plug 30 from jack 25 automatically reconnects maintenance termination circuit 40 to DDS network 41.

A specific implementation of connector unit 21 which was constructed and tested by the present inventors included terminations 42 and 43 having resistors r and r1 of 135 ohms each and capacitors C and C1 of 2.2 microfarads each. Consequently, those illustrative values of resistors r and r1 and capacitors C and C1 provided sufficient impedance to prevent any significant network noise to be introduced on the DDS network.

Obviously many modifications and variations of the present invention will be obvious to those skilled in the art in the light of the above teachings. In this regard, other passive devices that provide a test "signature" may be readily substituted for one or more of diodes D and D1. For example, zener diodes may be substituted for diodes D, D1 to provide a nonlinear test "signature" which has different polarity and voltage-dependent conduction characteristics in the transmit and receive conductor pairs. It is to be understood, therefore, that within the scope of the appended claims, the invention may be practiced otherwise than as specifically described.

What is claimed is:

1. A circuit connector for engagement with a mate connector comprising:

a pair of connector terminals;

a pair of auto-termination terminals;

a maintenance termination circuit connected across said pair of auto-termination terminals, said maintenance termination circuit providing a pre-defined terminating impedance across said auto-termination terminals and having signature means, responsive to a predetermined voltage applied across the auto-termination terminals, for supplying a pre-determined electrical output to said auto-termination terminals; and switch means, located within a first housing and connected to said connector terminals and said auto-termination terminals and being arranged for abutting actuation by the mate connector, for connecting each one of said connector terminals to a corresponding different one of said auto-termination terminals only when said circuit connector is not engaged with said mate connector so as to electrically terminate the connector terminals and for disconnecting said connector terminals from said auto-termination terminals when said circuit connector is engaged with said mate connector;

wherein as the mate connector is increasingly inserted into the first housing and engages with the circuit connector the mate connector abuts against and increasingly moves the switch means in order to disconnect said connector terminals from said auto-termination terminals so as to remove said terminating impedance from said connector terminals.

2. The circuit connector of claim 1 wherein said signature means is a conduction means polarized in a predetermined direction with respect to said connector terminals and having different conduction characteristics in different directions.

3. The circuit connector of claim 2 wherein said conduction means is comprised of a diode, and said switch means is a normally closed switchable jack having a plurality of moveable contacts and corresponding fixed contacts positioned for engagement with said moveable contacts.

4. The circuit connector of claim 3 wherein said auto-termination terminals are connected to different ones of said fixed contacts and said connector terminals are connected to different ones of said moveable contacts.

5. The circuit connector of claim 4 wherein said mate connector has associated contacts for establishing electrical contact with corresponding ones of the moveable contacts when said mate connector is engaged with the circuit connector.

6. The circuit connector of claim 5 further including:

a second housing having a cover and a mounting base plate; and a circuit board mounted in said second housing with said connector terminals, said auto-termination terminals, said switch means and said maintenance termination circuit mounted thereon, and wherein said cover has an opening that provides access to said jack.

7. A circuit connector for engagement with a mate connector comprising:

first and second pairs of connector terminals;

first and second pairs of auto-termination terminals;

a maintenance termination circuit connected across both of the pairs of auto-termination terminals, said maintenance termination circuit providing first and second pre-defined terminating impedances across said first and second pairs, respectively, of said auto-termination terminals and having signature means, responsive to a predetermined voltage applied across each of the first and second pairs of the auto-termination terminals, for supplying a separate pre-determined electrical output to said first and second pairs of auto-termination terminals, respectively; and switch means, located within a first housing and connected to all of said connector terminals and all of said auto-termination terminals and being arranged for abutting actuation by the mate connector, for connecting each one of all of said connector terminals to a corresponding different one of all of said auto-termination terminals only when said circuit connector is not engaged with said mate connector so as to electrically terminate the first and second pairs of connector terminals and for disconnecting all of said connector terminals from all of said auto-termination terminals when said circuit connector is engaged with said mate connector;

wherein as the mate connector is increasingly inserted into the housing and engages with the circuit connector the mate connector abuts against and increasingly moves the switch means in order to disconnect said connector terminals from said auto-termination terminals so as to remove said first and second terminating impedances from correspondingly said first and second pairs of connector terminals.

8. The circuit connector of claim 7 wherein said signature means comprises first and second diodes, each of which is connected to a different corresponding one of said first and second pairs of the auto-termination terminals and wherein said first and second diodes are connected in oppositely polarized fashion to the first and second pairs of auto-termination terminals, respectively.

9. The circuit connector of claim 8 wherein said switch means is a normally closed switchable jack having four moveable contacts and four corresponding fixed contacts biased into engagement with said moveable contacts.

10. The circuit connector of claim 9 wherein said auto-termination terminals are connected to different ones of said four fixed contacts and said connector terminals are connected to different ones of said four moveable contacts.

11. The circuit connector of claim 10 wherein said mate connector has associated contacts for establishing electrical contact with corresponding ones of the moveable contacts when said mate connector is engaged with the circuit connector.

12. The circuit connector of claim 11 further including:

a second housing having a cover and a mounting base plate; and a circuit board mounted in said second housing with said connector terminals, said auto-termination terminals, said switch means and said maintenance termination circuit mounted thereon, and wherein said cover has an opening that provides access to said jack.

13. In a communication network for providing electrical communication between a central communication system and a user facility, apparatus comprising:

first and second communication-line pairs connected to said central communication system;

third and fourth communication-line pairs connected to said user facility;

a mate connector coupled to said third and fourth communication-line pairs; and a circuit connector coupled to said first and second communication-line pairs, said circuit connector comprising:

first and second pairs of connector terminals to which said first and second communication-line pairs are connected, respectively;

first and second pairs of auto-termination terminals;

a maintenance termination circuit connected across both of the pairs of auto-termination terminals, said maintenance termination circuit providing pre-defined first and second terminating impedances across said first and second pairs, respectively, of said auto-termination terminals and having signature means, responsive to a predetermined voltage applied across each of the first and second pairs of the auto-termination terminals, for supplying a separate pre-determined electrical output to said first and second pairs of auto-termination terminals, respectively; and switch means, located within a first housing and connected to all of said connector terminals and all of said auto-termination terminals and being arranged for abutting actuation by the mate connector, for connecting each one of all of said connector terminals to a corresponding different one of all of said auto-termination terminals only when said circuit connector is not engaged with said mate connector so as to electrically terminate the first and second communication-line pairs and for disconnecting said first and second communication-line pairs from said auto-termination terminals when said circuit connector is engaged with said mate connector;

wherein as the mate connector is increasingly inserted into the housing and engages with the circuit connector the mate connector abuts against and increasingly moves the switch means in order to disconnect said first and second communication-line pairs from said auto-termination terminals so as to remove said first and second terminating impedances therefrom.

14. The apparatus of claim 13 wherein said signature means comprises first and second diodes, each of which is connected to a different corresponding one of said first and second pairs of the auto-termination terminals and wherein said first and second diodes are connected in oppositely polarized fashion to the first and second pairs of auto-termination terminals, respectively.

15. The apparatus of claim 14 wherein said switch means is a normally closed switchable jack having four moveable contacts and four corresponding fixed contacts biased into engagement with said moveable contacts.

16. The apparatus of claim 15 wherein said auto-termination terminals are connected to different ones of said four fixed contacts and said first and second communication-line pairs are connected to different ones of said four moveable contacts.

17. The apparatus of claim 16 wherein said mate connector has associated contacts for establishing electrical contact with corresponding ones of the moveable contacts when said mate connector is engaged with the circuit connector.

18. The apparatus of claim 17 wherein said central communication system is a digital data services network.

19. The apparatus of claim 18 wherein said circuit connector further includes:

a second housing having a cover and a mounting base plate; and a circuit board mounted in said second housing with said auto-termination terminals, said switch means and said maintenance termination circuit mounted thereon, and wherein said cover has an opening that provides access to said jack.

* * * * *